United States Patent [19]

Kump et al.

[11] Patent Number: 5,712,722
[45] Date of Patent: Jan. 27, 1998

[54] DRIVER CIRCUIT FOR STABILIZING OPTICAL OUTPUTS OF ACOUSTOOPTIC DEVICES

[75] Inventors: John Kump, Hillsborough; Richard A. Coppock, San Jose, both of Calif.

[73] Assignee: Crystal Technology, Inc., Palo Alto, Calif.

[21] Appl. No.: 711,025

[22] Filed: Sep. 9, 1996

[51] Int. Cl.$^6$ .................................................. G02F 1/11
[52] U.S. Cl. ................................. 359/285; 359/305
[58] Field of Search ............................ 359/285, 298, 359/305, 308; 385/4, 16; 356/349, 352

[56] References Cited

U.S. PATENT DOCUMENTS

| | | | |
|---|---|---|---|
| 4,389,093 | 6/1983 | Jackson | 359/298 |
| 4,602,342 | 7/1986 | Gottlieb et al. | 359/308 |
| 4,645,300 | 2/1987 | Brandstetter et al. | 359/308 |
| 5,008,851 | 4/1991 | Brandstetter et al. | 359/305 |
| 5,121,245 | 6/1992 | Johnson | 359/285 |
| 5,363,221 | 11/1994 | Sutton et al. | 359/298 |

Primary Examiner—Loha Ben

[57] ABSTRACT

A system for electronically powering an acoustooptic device. A radio-frequency (RF) generator supplies RF drive power at a drive carrier frequency. A signal source delivers a modulating signal. An RF modulator modulates the RF drive power with the modulating signal. Two compensating RF power generators supply high-frequency and low-frequency compensating power at frequencies greater than and less than the drive carrier frequency. Operational amplifiers and modulators modulate the compensating power with signals derived from the signal source such that the modulated compensating power is the complement of the modulated RF drive power. A summer combines the modulated RF drive power and compensating power to drive the acoustooptic device such that the spatial thermal energy distribution inside the acoustooptic device remains substantially constant.

15 Claims, 2 Drawing Sheets

DRIVER CIRCUIT FOR STABILIZING OPTICAL OUTPUTS OF ACOUSTOOPTIC DEVICES

BACKGROUND OF THE INVENTION

1. Field of the Invention

The invention relates to acoustooptic devices, and more particularly, to improved driver circuits for electronically powering acoustooptic devices.

2. Description of the Prior Art

Acoustooptic devices have found important applications in the fields of optical communications and signal processing. Optical communication networks, optical imaging systems and laser control circuits represent a few of the many systems that use acoustooptic devices. Laser systems often employ acoustooptic devices as intensity modulators and beam deflectors.

Acoustooptic modulators employed in prior art laser systems usually comprise an electronically driven acoustic transducer fixed to a transparent optical medium through which a laser beam can pass. As a laser directs its beam at the transparent medium, a driver circuit applies radio frequency (RF) drive power to electrodes on the transducer. In response to the RF drive power, the transducer launches acoustic waves in the transparent medium, which diffract the propagating laser beam into one or more directions. In general, the frequency of the RF drive power can control the deflection angles of the exiting laser beams, while the magnitude of the RF drive power can control the intensity of the exiting laser beams.

Although prior art acoustooptic modulators have served the purpose, they have not proved entirely satisfactory for use in high-performance, high-resolution laser applications due to thermally induced instabilities of the diffracted laser beams. Specifically, difficulties have been experienced in stabilizing the direction and/or shape of high-precision laser beams as they exit from acoustooptic modulators. It has been demonstrated that these instabilities, which can be critical in many applications, result from variations in a spatial thermal energy distribution inside the acoustooptic modulator.

A critical design parameter of an acoustooptic modulator is its "pointing stability." For proper operation of a laser system, an exiting laser beam should point in a predetermined direction. However, random variations in the spatial thermal energy distribution inside the acoustooptic modulator may cause the exiting laser beam to deflect from its intended pointing direction. In high performance laser systems, these unwanted beam deflections, referred to as "beam steering," can be unacceptable.

Random variations in the spatial thermal energy distribution may also cause significant deformations of the cross-sectional shapes of the exiting laser beams. In addition to being intensity modulated and pointed in a well-defined direction, an exiting laser beam should also maintain a well-defined cross-sectional shape, usually circular, over an operating range. Deformations in the cross-sectional shape of propagating laser beams are generally referred to as "ellipticity," which measures unwanted departures from circularity. It is known that anisotropic effects in the transparent medium generally cause ellipticity. Ellipticity changes to a propagating laser beam can occur as a result of normal acoustooptic interaction. This ellipticity is usually constant and, therefore, controllable by the particular design of the device. However, random thermal heating of acoustooptic modulators often result in unpredictable anisotropic effects which cause unwanted "thermal ellipticity."

The spatial thermal energy distribution in an acoustooptic modulator is primarily a function of the RF drive power. In those instances where the RF drive power remains relatively constant, the induced spatial thermal energy distribution in the acoustooptic modulator also remains constant and, therefore, predictable. Consequently, with relatively constant amounts of drive power, the amount of beam steering and/or thermal ellipticity are predictable and do not pose a serious problem; system designers simply shape the input laser beam to account for these predictable effects. In other words, when the transfer function of an acoustooptic modulator is known, designers simply tailor the incident laser beam with conventional optics so that the exiting laser beam points in the appropriate direction and has the correct cross sectional shape. During device operation, these beam characteristics usually remain stable as long as the drive power remains relatively constant.

In many acoustooptic modulators, however, transducer drive power can shift significantly from a low power to a high power to modulate the output intensity of an incident laser beam. Also, acoustooptic modulators often have an irregular duty cycle, resulting in random applications of drive power. Such variations in drive power can cause significant variations in the spatial thermal energy distribution of the modulator materials, which in turn can cause unwanted beam steering and/or thermal ellipticity. These instabilities can seriously degrade the efficiency of high-performance laser systems. Consequently, those concerned with the development of optical systems have recently recognized a need for improved driver circuits and techniques of electronically powering acoustooptic modulators and other acoustooptic devices such that beam steering and thermal ellipticity are stabilized.

SUMMARY OF THE INVENTION

To satisfy the need in the art, the present invention teaches a driver circuit for powering an acoustooptic device such that beam steering and thermal ellipticity are stabilized and remain substantially constant throughout the operating range of the device. A radio-frequency (RF) generator supplies RF drive power to the driver circuit at a drive carrier frequency. A signal source delivers a modulating signal. Within the circuit, an RF modulator, connected to the RF generator and the signal source, supplies modulated RF drive power. Also within the drive circuit, a compensating RF power device connects to the signal source for supplying RF compensating power at frequencies different from the drive carrier frequency such that the RF compensating power complements the RF drive power. A signal combiner, within the circuit, combines the RF drive power and the RF compensating power. A driver, also within the circuit, connects to the signal combiner and the drive terminal for powering the acoustooptic device with the RF drive power and the RF compensating power such that the spatial thermal energy distribution inside the acoustooptic device remains substantially constant.

The invention also teaches a method of electronically powering an acoustooptic device comprising the following steps: supplying RF drive power at a drive carrier frequency; supplying a modulating signal; modulating the RF drive power with the modulating signal; supplying RF compensating power at frequencies different from the drive carrier frequency, the RF compensating power being the complement of the RF drive power; combining the RF drive power and the RF compensating power; and powering the acoustooptic device by applying the combination of the RF drive power and the RF compensating power to a drive terminal of the acoustooptic device such that the spatial thermal energy distribution inside the acoustooptic device remains substantially constant.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENT

Figure 1:
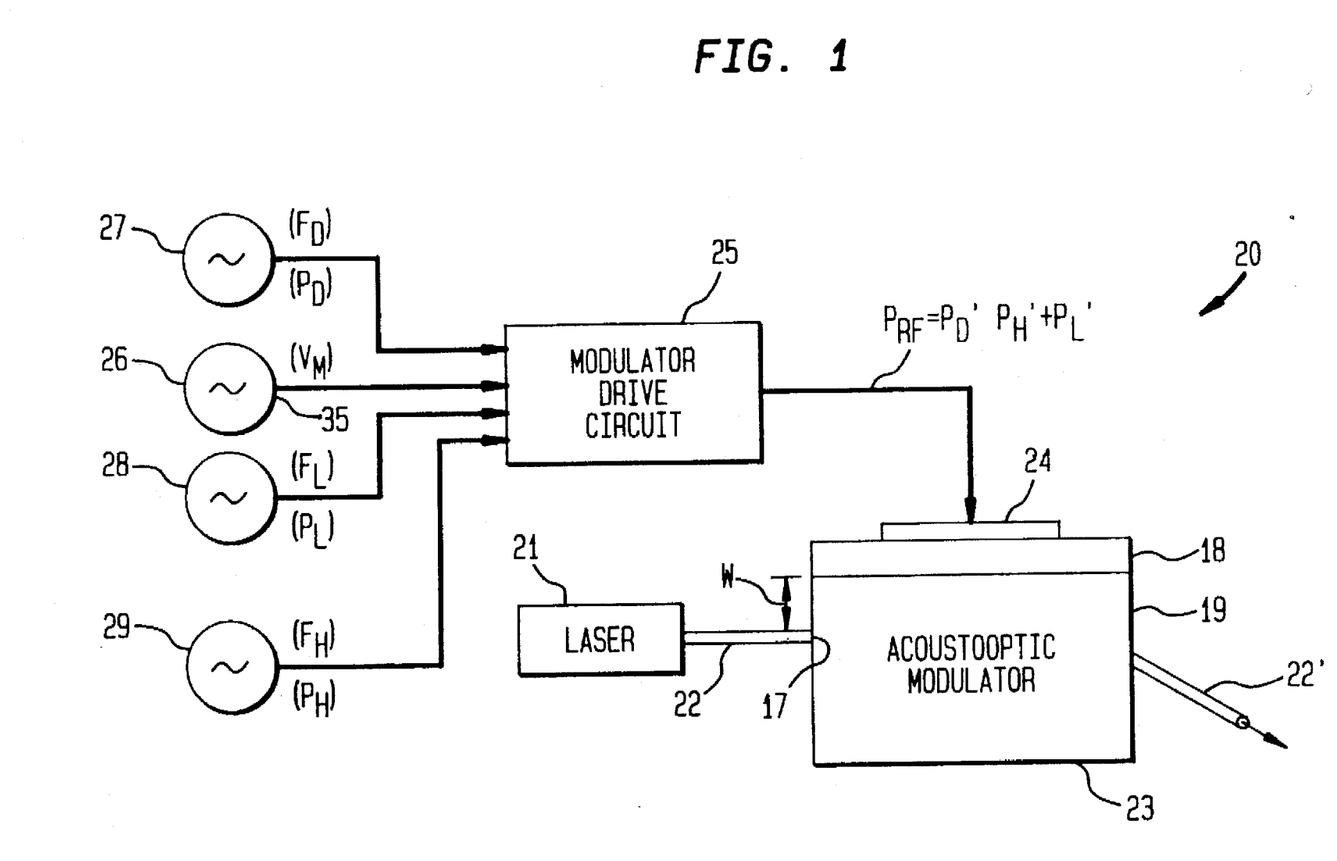
FIG. 1 is a block diagram of an optical system which conceptually illustrates a technique for electronically stabilizing the output of an acoustooptic modulator in accordance with the present invention.

Referring now to the drawings, FIG. 1 illustrates optical system 20 comprising conventional laser 21 and acoustooptic modulator 23. Acoustooptic modulator 23 includes drive electrode 24 fixed to acoustic transducer 18, e.g., a piezoelectric crystal, which is attached to transparent optical mdedium 19, e.g., an aniosotropic single crystal of tellurium-oxide, $TeO_2$. Laser 21 directs laser beam 22 at the input face of transparent optical medium 19. Incident laser beam 22 enters transparent optical medium 19 at aperture 17 spaced a distance "W" from the interface of acoustic transducer 18 and transparent optical medium 19. Modulator drive circuit 25 powers acoustooptic modulator 23 with radio-frequency (RF) power $P_{RF}$ applied to drive electrode 24. RF power $P_{RF}$ causes acoustic transducer 18 to launch ultrasonic waves in transparent optical medium 19, producing an acoustooptic interaction between propagating laser beam 22 and the ultrasonic waves which may diffract portions of laser beam 22 into one or more directions. FIG. 1 depicts an exiting laser beam 22', which represents one of the diffracted component beams of incident laser beam 22 as the diffracted beam exits transparent optical medium 19.

Signal source 26, a conventional information or data source, outputs modulating voltage $V_M$. Modulator drive circuit 25 powers acoustooptic modulator 23 with a combination of conventional RF drive power $P_D'$ and compensating RF power $P_H'$ and $P_L'$. RF generator 27 provides unmodulated RF drive power $P_D$ with drive carrier frequency $f_D$. RF generator 28 provides unmodulated compensating RF power $P_H$ with high carrier frequency $f_H$, which is greater than drive carrier frequency $f_D$. RF generator 29 provides unmodulated compensating RF power $P_L$ with low carrier frequency $f_L$, which is less than drive carrier frequency $f_D$. In a manner to be described below in detail with respect to FIG. 2, modulator drive circuit 25 modulates and combines the three RF carrier signals ($P_D$, $P_L$, $P_H$) to deliver constant RF power $P_{RF}$ as the sum of $P_D'$, $R_H'$ and $P_L'$.

As described above, frequencies $f_L$, $f_H$, and $f_D$, contained in RF power $P_{RF}$, control the deflection angles of exiting laser beams, of which laser beam 22' is one. Also, the magnitudes of the components of RF power $P_{RF}$ modulate the intensity of these deflected laser beams, including laser beam 22'. Additionally, the magnitude of RF power $P_{RF}$ primarily determines the spatial thermal energy distribution inside transparent optical medium 19. Therefore, acoustooptic modulator 23 must rely on variations in the electrical RF drive power at electrode 24 and the resulting acoustooptic effect to modulate the intensity of output laser beam 22'.

However, the process of electronically driving acoustooptic modulator 23 with electrical RF power is inherently inefficient, producing thermal energy as well as acoustic energy in transparent optical medium 19. In particular, the spatial content of thermal energy in transparent optical medium 19 contains at least two components: a first component resulting from heat production at acoustic transducer 18 due to inefficient conversion of energy from RF power to acoustic energy; and a second component resulting from acoustic attenuation in transparent optical medium 19, which varies as a square of the acoustic wave frequency.

Optical system 20 electronically stabilizes beam steering and thermal ellipticity by driving acoustooptic modulator 23 with compensating power $P_H'$ and $P_L'$ such that the resulting compensating acoustic energy complements the drive acoustic energy resulting from RF drive power $P_D'$. By mixing two compensating acoustic fields, one having carrier frequency $f_L$ below drive frequency $f_D$, and the other having carrier frequency $f_H$ above drive frequency $f_D$, the spatial heating can be held constant without interfering with the characteristics of exiting laser beam 22'. Since acoustic attenuation varies as the square of the acoustic wave frequency, high frequency $f_H$ and low frequency $f_L$ are chosen to yield a ratio "S" as follows:

$$S = \frac{f_L^2 \cdot e^{-\alpha \tau f_L^2} - f_D^2 \cdot e^{-\alpha \tau f_D^2}}{f_D^2 \cdot e^{-\alpha \tau f_D^2} - f_H^2 \cdot e^{-\alpha \tau f_H^2}} ; \quad (1)$$

$$\tau = W/v; \quad (2)$$

W is the distance from aperture 17 to the interface of acoustic transducer 18 and transparent optical medium 19;

α is the attentuation constant of transparent optical medium 19; and v is the velocity of sound in transparent optical medium 19.

Figure 2:
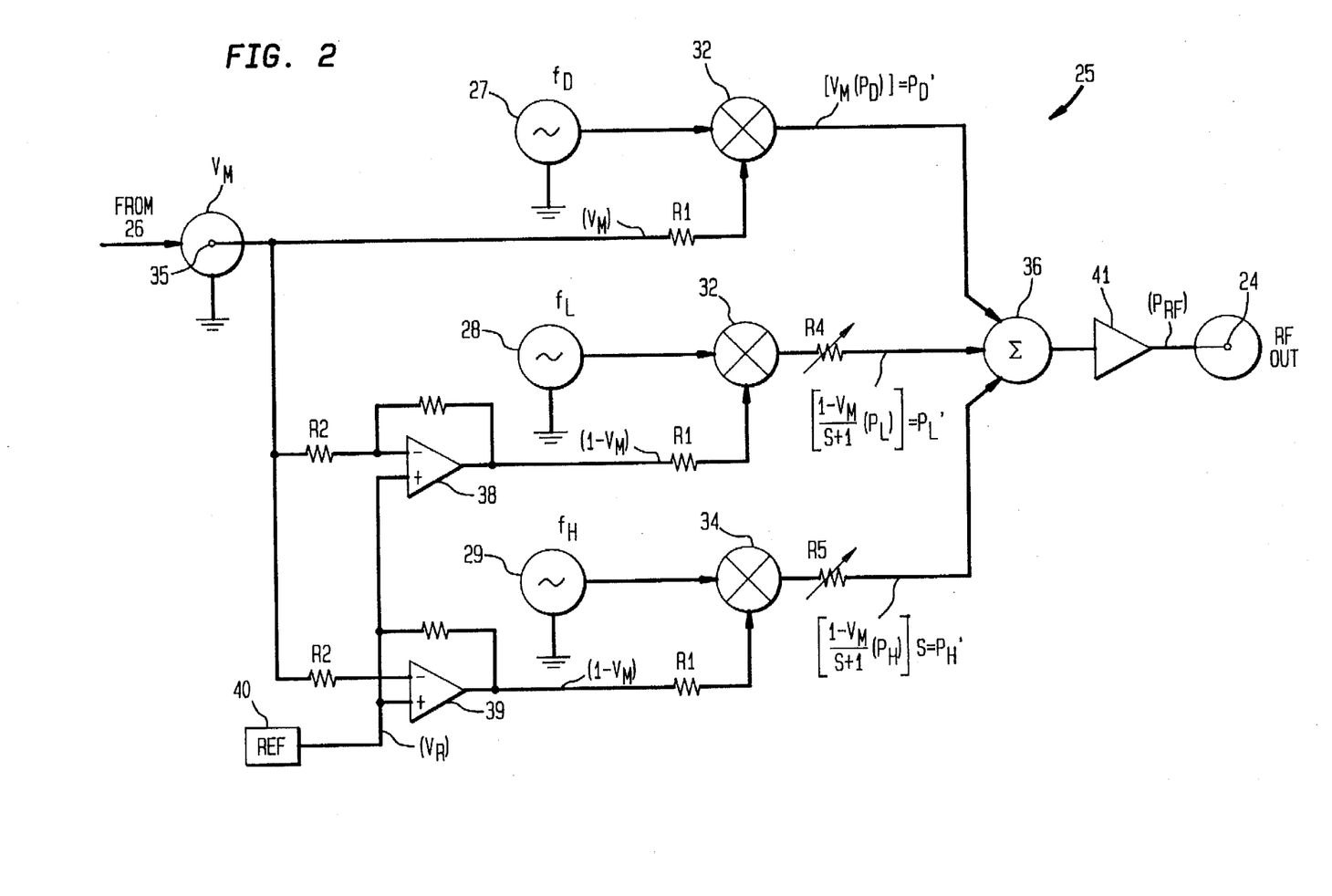
FIG. 2 is a schematic circuit diagram illustrating a detailed implementation of a drive circuit for powering the acoustooptic modulator employed in the FIG. 1 system.

With reference to FIG. 2, modulator drive circuit 25 includes three linearized modulators 32, 33 and 34. Input terminal 35, which connects to modulating signal source 26 (see FIG. 1), delivers modulating voltage $V_M$ to one input of modulator 32 (shown in FIG. 2) via input resistor R1. Modulating voltage $V_M$ represents a dimensionless quantity that varies between normalized values of +1 and zero. RF generator 27 delivers conventional RF drive power, with drive carrier frequency $f_D$ and power $P_D$, to another input of modulator 32. The output of modulator 32, which connects to an input of summer 36, comprises an amplitude modulated signal having a carrier frequency $f_D$ and drive power $P_D'$ equal to $V_M(P_D)$. As discussed above, carrier frequency $f_D$ will determine the deflection angle of the desired output laser beam 22' (see FIG. 1) while RF drive power $P_D'$ will modulate the intensity of beam 22'.

Input terminal 35, shown in FIG. 2, also connects to the inverting inputs of operational amplifiers 38 and 39 via two corresponding resistors R2. The noninverting inputs of operational amplifiers 38 and 39 connect in common to voltage reference 40, which delivers reference voltage $V_R$. Operational amplifiers 38 and 39, reference voltage $V_R$ and resistors R2 are chosen so that the operational amplifiers 38 and 39 each deliver a voltage substantially equal to $(1-V_M)$.

The output of operational amplifier 38 connects to one input of modulator 33 via resistor R1. RF generator 28 delivers compensating RF power, with low carrier frequency $f_L$ and power $P_L$, to the other input of mixer 33. The output of modulator 33 connects to an input of summer 36 via adjustable attenuator R4, which is adjusted to output an amplitude modulated signal having low carrier frequency $f_L$ and low-frequency compensating power $P_L'$ equal to $$\frac{1-V_M}{S+1} \cdot P_L.$$

The output of operational amplifier 39 connects to one input of modulator 34 via resistor R1. RF generator 29 delivers compensating RF power, with high carrier frequency $f_H$ and power $P_H$, to the other input of modulator 34. The output of modulator 34 connects to an input of summer 36 via adjustable attenuator R5, which is adjusted to output an amplitude modulated signal having high carrier frequency $f_H$ and high-frequency compensating power $P_H'$ equal to $$\frac{1-V_M}{S+1} \cdot S \cdot P_H.$$

Additionally, the inputs to linearized modulators 32, 33 and 34 are preferably equal to each other to have uniform performance. Therefor, the following expressions summarize the preferred relationshps between powers $P_D$, $P_L$, $P_H$, $P_D'$, $P_L'$ and $P_H'$:

$$P_D = P_L = P_H; \tag{3}$$

$$P_D' = V_M \cdot P_D; \tag{4}$$

$$P_L' = \frac{1-V_M}{S+1} \cdot P_L; \tag{5}$$

$$P_H' = \frac{1-V_M}{S+1} \cdot S \cdot P_H; \tag{6}$$

The term $$\left(\frac{1-V_M}{S+1}\right)$$

establishes that the compensating power ($P_L + P_H$) is the complement of the drive power $P_D'$. The ratio "S" establishes the relationship of the high-frequency compensating power $P_H'$ to the low-frequency compensating power $P_L'$.

Summer 36 feeds RF power amplifier 41 with the sum of its three inputs. The output of power amplifier 41 connects to electrode 24, powering acoustooptic modulator 23 with RF power $P_{RF}$ having carrier frequencies $f_D$, $f_L$ and $f_H$. The carrier frequencies $f_L$ and $f_H$, which correspond to the compensating power, will cause portions of incident laser beam 22 to be deflected into angles which differ from that of beam 22'. Also, the compensating power will modulate only those output laser beams associated with carrier frequencies $f_L$ and $f_H$, thereby having no effect on the intensity of beam 22'. RF power $P_{RF}$ remains constant, equaling the sum of the inputs to summer 36 as follows:

$$P_{RF} = P_D' + P_L' + P_H'; \tag{7}$$

which converts to:

$$P_{RF} = V_M(P_D) + [(1-V_M)/(S+1)](P_L) + [(1-V_M)/(S+1)](P_H)S \tag{8}$$

As can be seen from equation (8), when modulating voltage $V_M$ increases, the contribution of the compensating powers to RF power $P_{RF}$ decreases proportionally. Conversely, when modulating voltage $V_M$ decreases, the contribution of the compensating powers to RF power $P_{RF}$ increases proportionally. This complementing technique results in maintaining a constant level of acoustic energy in acoustooptic modulator 23, thereby stabilizing beam steering and thermal ellipticity.

For example and with reference to FIG. 2 and equation (8), when modulating voltage $V_M$ equals +1 (the maximum value), the output power of modulators 33 and 34 each equal zero and RF power $P_{RF}$ equals $P_D$. When modulating voltage $V_M$ equals zero (the minimum value), the output power of mixer 32 equals zero, the output power of attenuator R4 equals $$\frac{P_L}{S+1},$$

the output power of attenuator R5 equals $$\frac{S \cdot P_H}{S+1}.$$

Consequently, by choosing the compensating power levels in accordance with the above teachings, the spatial thermal energy distribution inside acoustooptic modulator 23 remains substantially constant. As such, beam steering and thermal ellipticity will remain substantially constant. As explained above, when beam steering and thermal ellipticity remain constant over the operating range, system designers may shape incident laser beam 22 so that exiting laser beam 22' points in the appropriate direction and has the correct cross-sectional shape. These beam characteristics will stabilize because RF power $P_{RF}$ remains constant.

Obviously many modifications and variations of the present invention are possible in the light of the above teachings. For example, the embodiment of FIGS. 1 and 2 show optical system 20 comprising only two compensating power sources, viz., RF generators 28 and 29. Although two sources of compensating power having frequencies properly spaced on either side of the conventional RF drive frequency suffices for most applications, those skilled in the art will recognize that a larger number of compensating power sources may also be used when necessary. Additionally, in cases where less stringent stability control over beam steering and thermal ellipticity exist, a simpler single-frequency compensating power source may be used. Of course, in the single-frequency case, equation (1) does not apply and the spatial content of thermal energy in acoustooptic modulator 23 will be less than optimum.

It is to be understood, therefore, that within the scope of the appended claims, the invention may be practiced otherwise than as specifically described.

What is claimed is:

1. A system for electronically powering an acoustooptic device comprising:
   an acoustooptic device having a drive electrode, an acoustic transducer, and a transparent optical medium with an aperture;
   a radio-frequency (RF) drive power generator supplying RF drive power at a drive carrier frequency;
   a source of a modulating signal;
   an RF modulator connected to said RF drive power generator and said modulating signal source, said RF modulator supplying modulated RF drive power modulated with said modulating signal;
   compensating RF power means for supplying RF compensating power at frequencies different from said drive carrier frequency, said RF compensating power complementing said modulated RF drive power;

combining means for combining said modulated RF drive power and said RF compensating power; and drive means connected to said combining means and said drive electrode for powering said acoustooptic device with the combination of said modulated RF drive power and said RF compensating power such that the spatial thermal energy distribution inside said acoustooptic device remains substantially constant.

2. The system of claim 1 wherein said compensating RF power means includes a first generator supplying low-frequency compensating power at a low carrier frequency less than said drive carrier frequency and a second RF power generator supplying high-frequency compensating power at a high carrier frequency greater than said drive carrier frequency.

3. The system of claim 2 further including first modulator means connected to said source and said first RF power generator for modulating said low-frequency compensating power, and second modulator means connected to said source and said second RF power generator for modulating said high-frequency compensating power.

4. The system of claim 3 wherein said combining means includes a summer connected to said RF modulator, said first modulator means and said second modulator means.

5. The system of claim 4 wherein said first modulator means and said second modulator means deliver said RF compensating power as the complement of said modulated RF drive power.

6. The system of claim 5 wherein said drive means powers said acoustooptic device such that the following relationships apply:

$$P_{RF}=P'_D+P'_L+P'_H$$

$$P'_D=V_M \cdot P_D$$

$$P'_L = \frac{1-V_M}{S+1} \cdot P_L;$$

$$P'_H = \frac{1-V_M}{S+1} \cdot S \cdot P_H;$$

$$S = \frac{f_L^2 \cdot e^{-\alpha v \tau_L^2} - f_D^2 \cdot e^{-\alpha v \tau_D^2}}{f_D^2 \cdot e^{-\alpha v \tau_D^2} - f_H^2 \cdot e^{-\alpha v \tau_H^2}};$$

$$\tau = W/v;$$

where:

$f_D$ is said drive carrier frequency;

$f_H$ is said high carrier frequency;

$f_L$ is said low carrier frequency;

$V_M$ is said modulating signal;

$P_D$ is said RF drive power;

$P_D'$ is said modulated RF drive power;

$P_L$ is said low-frequency compensating power;

$P_L'$ is modulated low-frequency compensating power;

$P_H$ is said high-frequency compensating power;

$P_H'$ is modulated high-frequency compensating power;

$\alpha$ is the attenuation constant of said acoustooptic modulator;

$v$ is the velocity of sound in said acoustooptic modulator; and $W$ is the distance in said acoustooptic modulator between said aperture and said transducer.

7. The system of claim 6 wherein said first modulator means and said second modulator means each include operational amplifiers having inputs connected to said source of said modulating signal.

8. The system of claim 7 wherein said acoustooptic device includes an acoustooptic modulator means for modulating the intensity of a laser beam in accordance with said modulated RF drive power $P_D'$ and deflects said laser beam into a predetermined angle in accordance with said drive carrier frequency $f_D$.

9. The system of claim 8 wherein said RF drive power, said low-frequency drive power and said high-frequency drive power are substantially equal.

10. A method of electronically powering an acoustooptic device having an acoustic transducer and an aperture comprising:

supplying RF drive power at a drive carrier frequency;

supplying a modulating signal;

modulating said RF drive power with said modulating signal to form modulated RF drive power;

supplying RF compensating power at frequencies different from said drive carrier frequency, said RF compensating power being the complement of said modulated RF drive power;

combining said modulated RF drive power and said RF compensating power; and powering said acoustooptic device by applying to said acoustic transducer the combination of said modulated RF drive power and said RF compensating power such that the spatial thermal energy distribution inside said acoustooptic device remains substantially constant.

11. The method of claim 10 wherein said step of supplying RF compensating power includes supplying low-frequency compensating power at a low carrier frequency less than said drive carrier frequency and supplying high-frequency compensating power at a high carrier frequency greater than said drive carrier frequency.

12. The method of claim 11 further including modulating said low-frequency compensating power and said high-frequency compensating power high-frequency with compensation signals derived from said modulating signal.

13. The method of claim 12 wherein said combining step includes summing said modulated RF drive power and said RF compensating power to produce a substantially constant output power, and applying said output power to drive said acoustooptic device.

14. The method of claim 13 wherein said step of powering said acoustooptic device includes applying power such that the following relationships apply:

$$P_{RF}=P'_D+P'_L+P'_H$$

$$P'_D=V_M \cdot P_D$$

$$P'_L = \frac{1-V_M}{S+1} \cdot P_L;$$

$$P'_H = \frac{1-V_M}{S+1} \cdot S \cdot P_H;$$

$$S = \frac{f_L^2 \cdot e^{-\alpha v \tau_L^2} - f_D^2 \cdot e^{-\alpha v \tau_D^2}}{f_D^2 \cdot e^{-\alpha v \tau_D^2} - f_H^2 \cdot e^{-\alpha v \tau_H^2}};$$

$$\tau = W/v;$$

where:

$f_D$ is said drive carrier frequency;

$f_H$ is said high carrier frequency;

$f_L$ is said low carrier frequency;

$V_M$ is said modulating signal;

$P_D$ is said RF drive power;

$P_D'$ is said modulated RF drive power;

$P_L$ is said low-frequency compensating power;

$P_L'$ is modulated low-frequency compensating power;

$P_H$ is said high-frequency compensating power;

$P_H'$ is modulated high-frequency compensating power;

$\alpha$ is the attenuation constant of said acoustooptic modulator;

v is the velocity of sound in said acoustooptic modulator; and

W is the distance in said acoustooptic device between said transducer and said aperture.

15. The method of claim 14 further including passing a laser beam through said acoustooptic device, and wherein said acoustooptic device includes an acoustooptic modulator and said output power drives said acoustooptic modulator such that said laser beam is intensity modulated in accordance with said electronic drive power $P_D'$ and said laser beam deflects into a predetermined angle in accordance with said drive carrier frequency $f_D$.

* * * * *

UNITED STATES PATENT AND TRADEMARK OFFICE
CERTIFICATE OF CORRECTION

PATENT NO.  :  5,712,722

DATED       :  January 27, 1998

INVENTOR(S) :  Kump et al.

It is certified that error appears in the above-identified patent and that said Letters Patent is hereby corrected as shown below:

SUBSTITUTE THE TITLE PAGE WITH THE ATTACHED TITLE PAGE

Signed and Sealed this

Fifth Day of May, 1998

Attest:

BRUCE LEHMAN

Attesting Officer          Commissioner of Patents and Trademarks

United States Patent [19]

Kump et al.

[11] Patent Number: 5,712,722
[45] Date of Patent: Jan. 27, 1998

[54] DRIVER CIRCUIT FOR STABILIZING OPTICAL OUTPUTS OF ACOUSTOOPTIC DEVICES

[75] Inventors: John Kump, Hillsborough; Richard A. Coppock, San Jose, both of Calif.

[73] Assignee: Crystal Technology, Inc., Palo Alto, Calif.

[21] Appl. No.: 711,025

[22] Filed: Sep. 9, 1996

[51] Int. Cl.$^6$ .................................................. G02F 1/11
[52] U.S. Cl. ........................................ 359/285; 359/305
[58] Field of Search ............................... 359/285, 298, 359/305, 308; 385/4, 16; 356/349, 352

[56] References Cited

U.S. PATENT DOCUMENTS

| | | | |
|---|---|---|---|
| 4,389,093 | 6/1983 | Jackson | 359/298 |
| 4,602,342 | 7/1986 | Gottlieb et al. | 359/308 |
| 4,645,300 | 2/1987 | Brandstetter et al. | 359/308 |
| 5,008,851 | 4/1991 | Brandstetter et al. | 359/305 |
| 5,121,245 | 6/1992 | Johnson | 359/285 |
| 5,363,221 | 11/1994 | Sutton et al. | 359/298 |

*Primary Examiner*—Loha Ben

[57] ABSTRACT

A system for electronically powering an acoustooptic device. A radio-frequency (RF) generator supplies RF drive power at a drive carrier frequency. A signal source delivers a modulating signal. An RF modulator modulates the RF drive power with the modulating signal. Two compensating RF power generators supply high-frequency and low-frequency compensating power at frequencies greater than and less than the drive carrier frequency. Operational amplifiers and modulators modulate the compensating power with signals derived from the signal source such that the modulated compensating power is the complement of the modulated RF drive power. A summer combines the modulated RF drive power and compensating power to drive the acoustooptic device such that the spatial thermal energy distribution inside the acoustooptic device remains substantially constant.

15 Claims, 2 Drawing Sheets

UNITED STATES PATENT AND TRADEMARK OFFICE
CERTIFICATE OF CORRECTION

PATENT NO. : 5,712,722
DATED : January 27, 1997
INVENTOR(S): John Kump, Richard A. Coppock It is certified that error appears in the above-identified patent and that said Letters Patent is hereby corrected as shown below:

In the drawings, Sheet 1, Fig.1 should be replaced with the following Fig. 1:

*FIG. 1*

UNITED STATES PATENT AND TRADEMARK OFFICE
CERTIFICATE OF CORRECTION

PATENT NO. : 5,712,722
DATED : January 27, 1997
INVENTOR(S): John Kump, Richard A. Coppock It is certified that error appears in the above-identified patent and that said Letters Patent is hereby corrected as shown below:

In the drawings, Sheet 2, Fig.2 should be replaced with the following Fig. 2:

FIG. 2